W. A. LORENZ.
GLASS PRESSING MACHINE.
APPLICATION FILED DEC. 26, 1913.

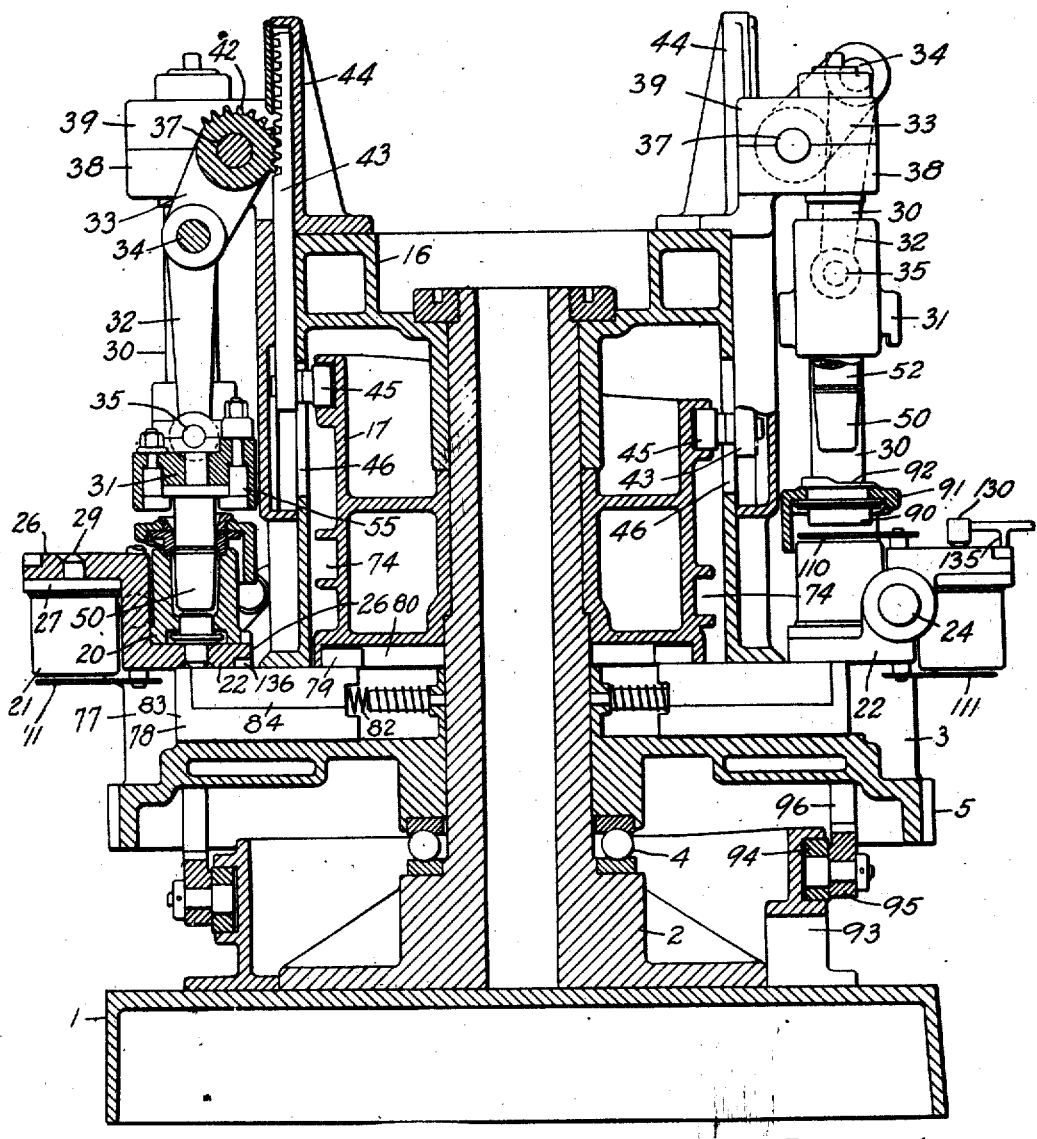

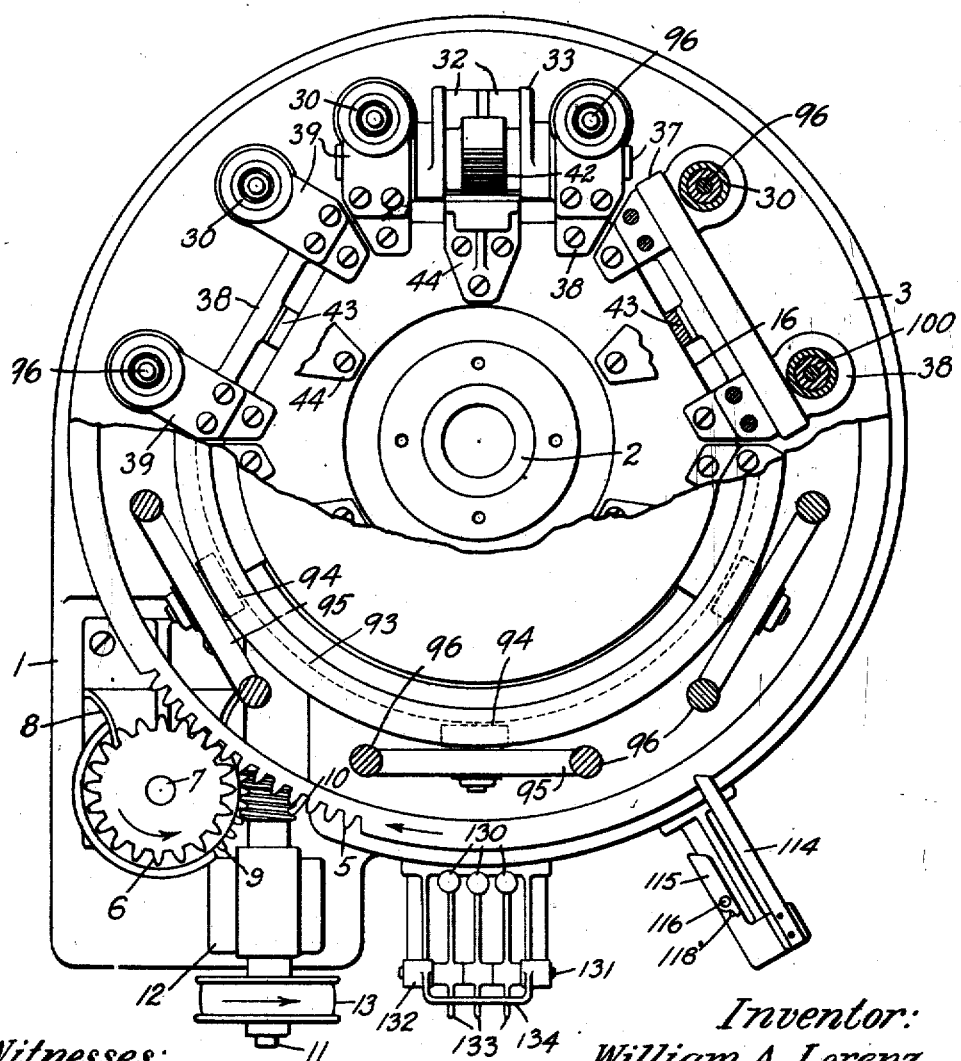

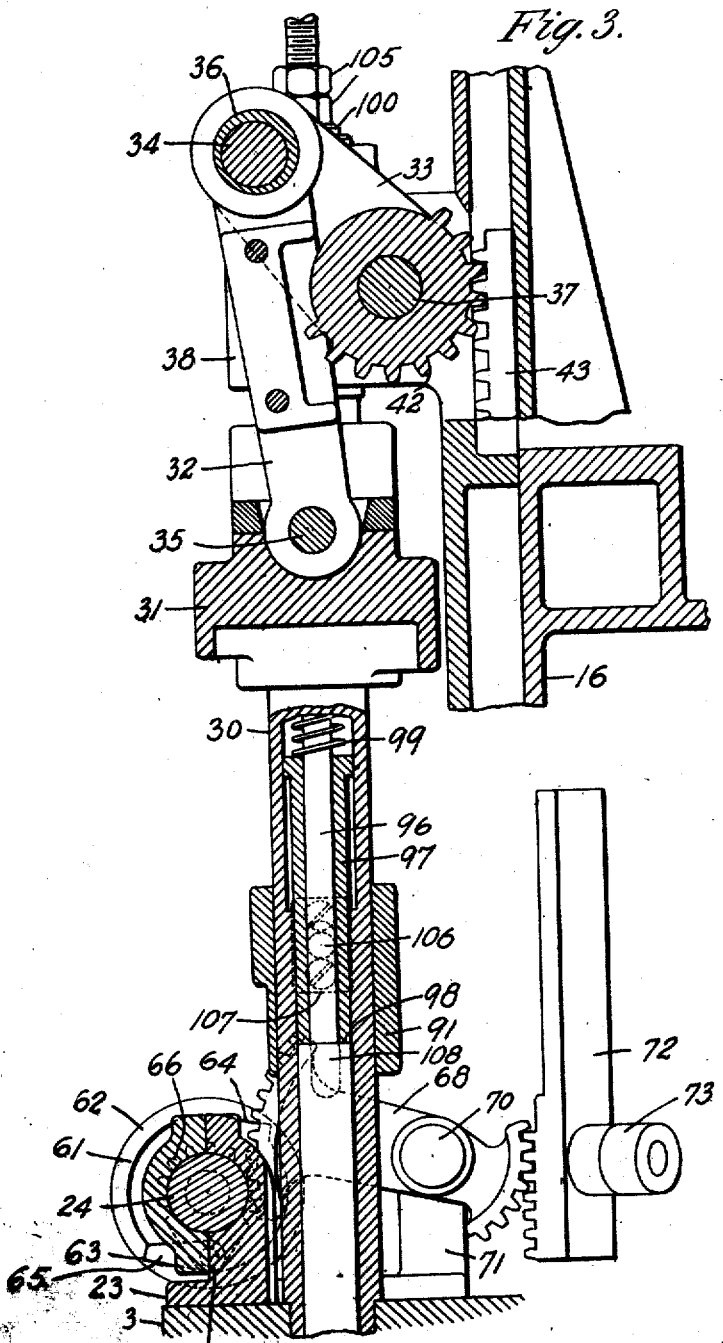

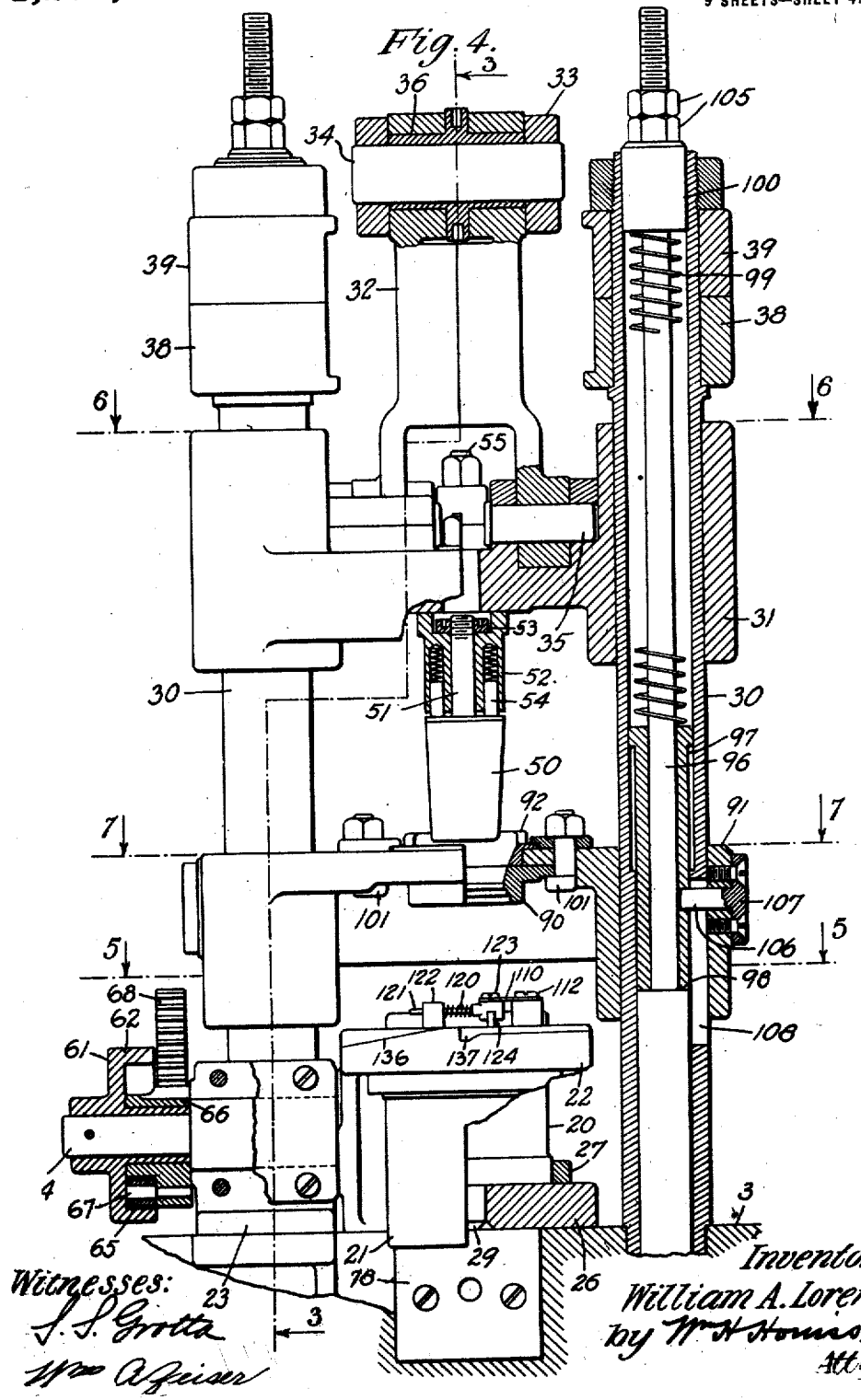

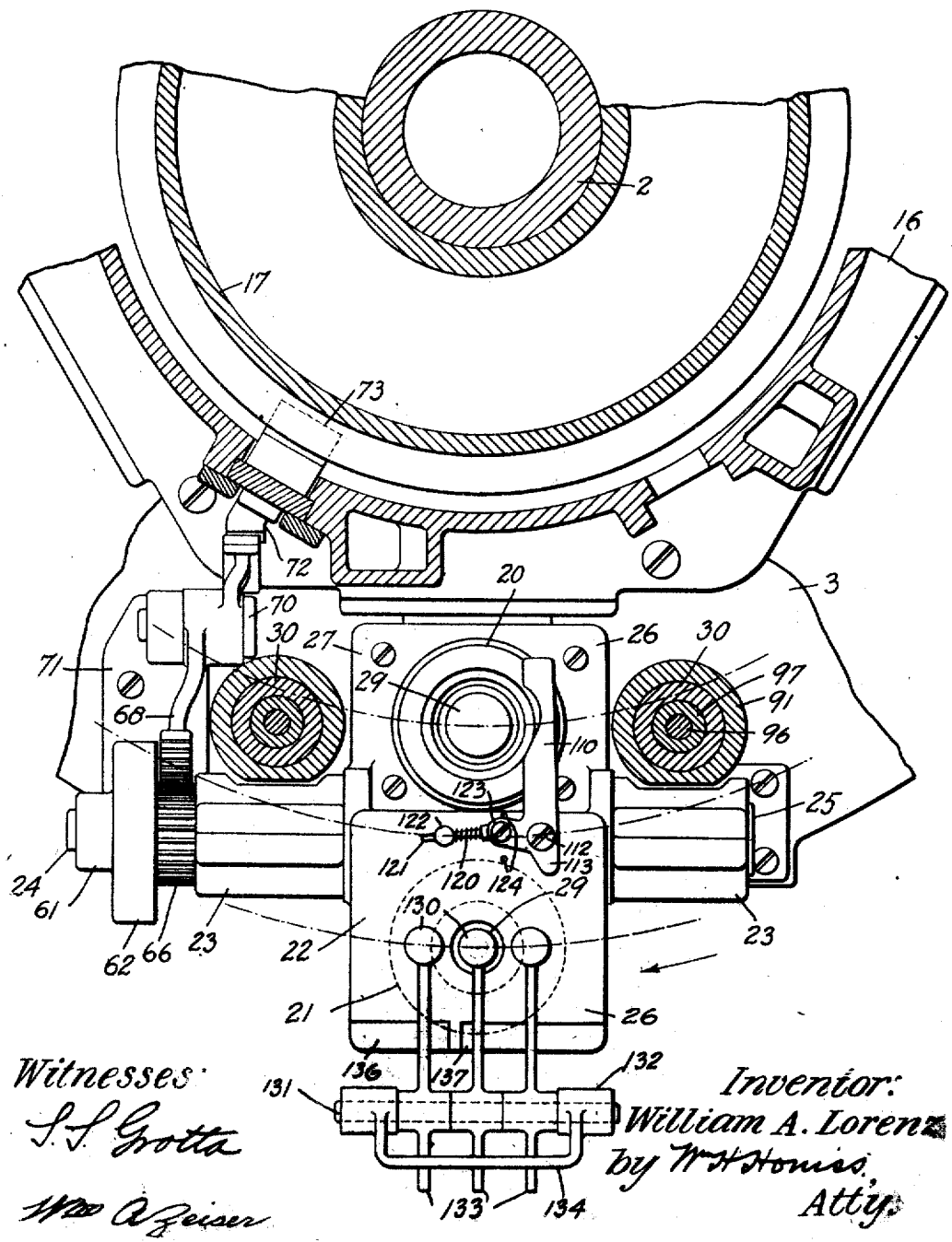

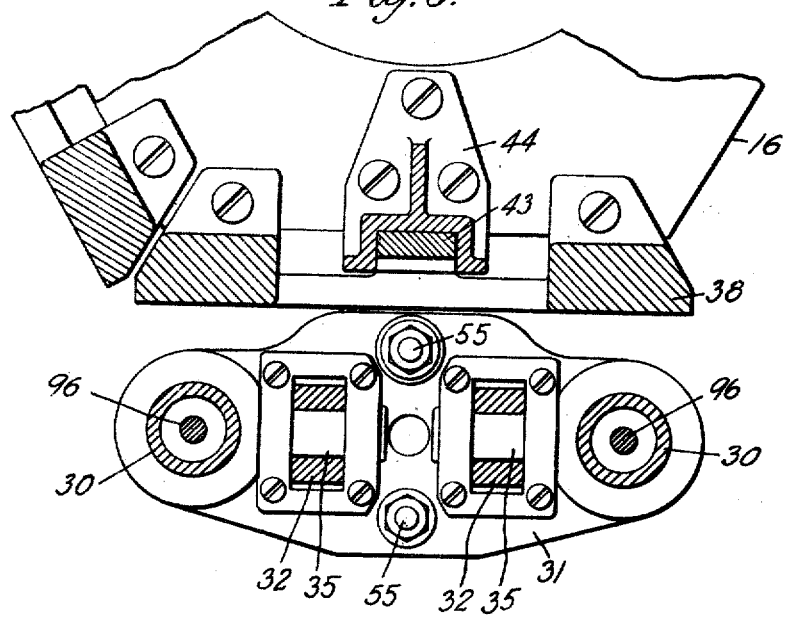
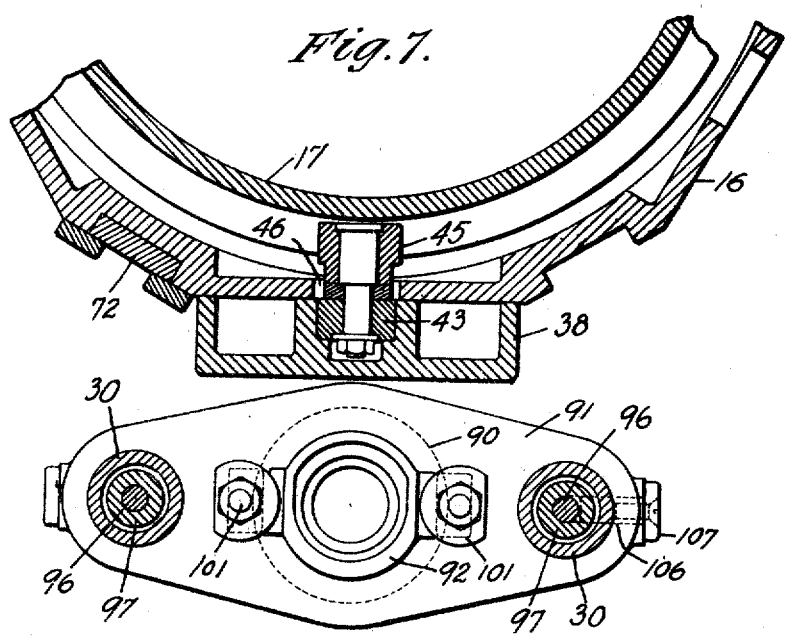

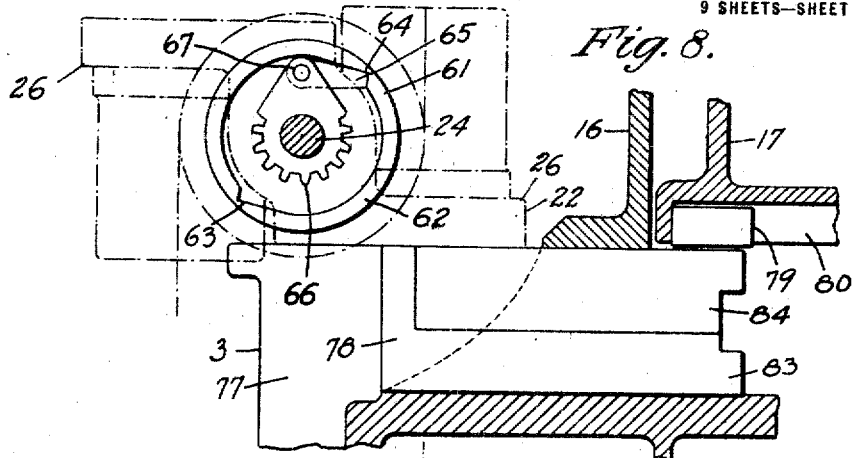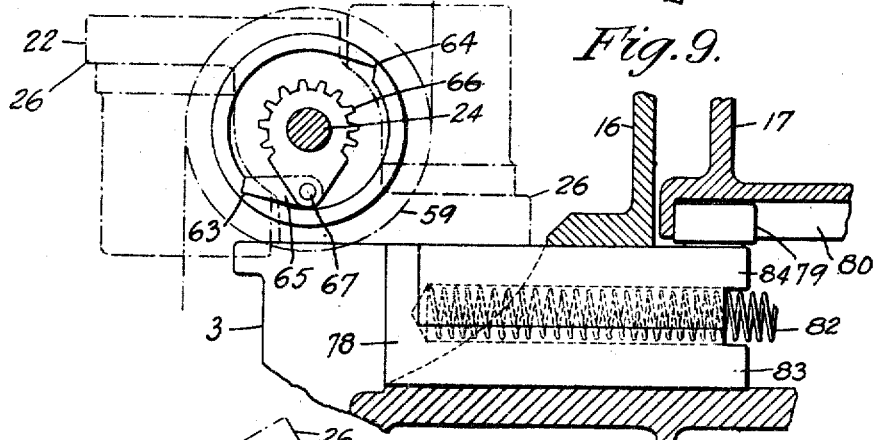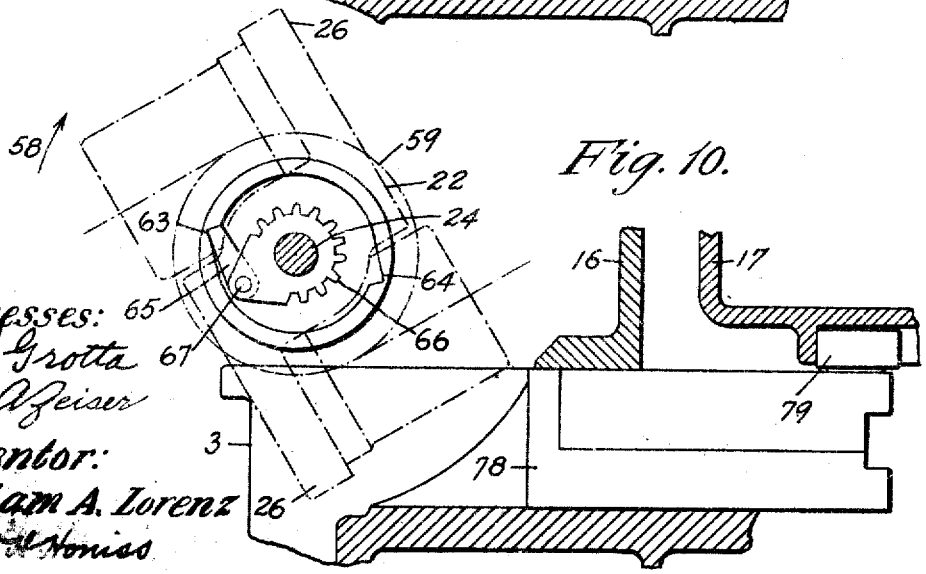

1,291,952.

Patented Jan. 21, 1919.
9 SHEETS—SHEET 8.

Witnesses:

Inventor
William A. Lorenz
by
Atty.

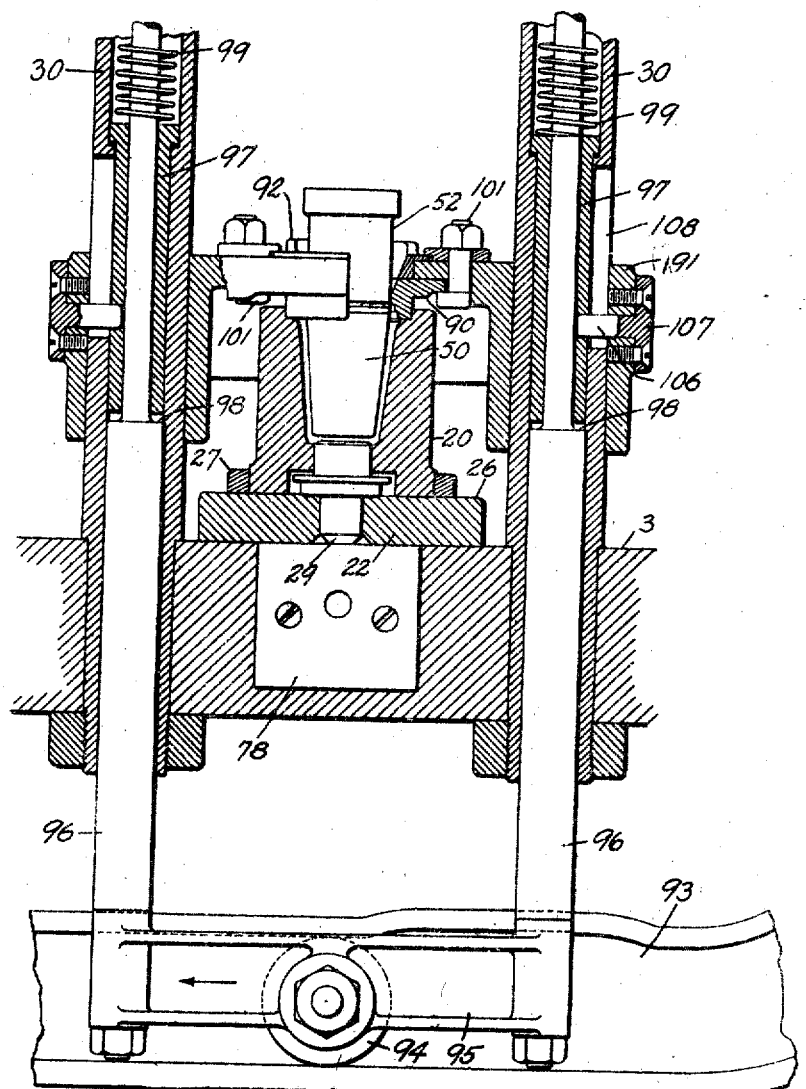

UNITED STATES PATENT OFFICE.

WILLIAM A. LORENZ, OF HARTFORD, CONNECTICUT, ASSIGNOR TO HARTFORD-FAIRMONT COMPANY, OF CANAJOHARIE, NEW YORK, A CORPORATION OF NEW YORK.

GLASS-PRESSING MACHINE.

1,291,952.    Specification of Letters Patent.    Patented Jan. 21, 1919.

Application filed December 26, 1913. Serial No. 808,803.

*To all whom it may concern:*

Be it known that I, WILLIAM A. LORENZ, a citizen of the United States, residing at Hartford, in the county of Hartford and State of Connecticut, have invented new and useful Improvements in Glass-Pressing Machines, of which the following is a specification.

This invention comprises improvements in machines for shaping molten glass by pressure, the object of the invention being to provide a compact, convenient and effective organization of mechanism for automatically operating the molds and mold rings of such machines.

The present invention, which may be modified in many ways which will be obvious to those familiar with this art, is herein shown and described as being embodied in a rotary glass pressing machine having a plurality of sets of pressing mechanisms revolving around a central vertical axis. Each set comprises a single shaping plunger and a single mold ring operating in conjunction with a pair of molds, while all are revolving together around the said central vertical axis. The molds are also mounted on a horizontal axis, on which the pair of molds are turned to bring them alternately into tangential pressing relation to their mold ring and plunger, the filled molds being inverted by this turning movement to facilitate the discharge of the pressed ware from the molds when sufficiently cooled. This horizontal axis of turning movement is preferably located outside of the circle of revolution of the plungers, so that the molds are swung outwardly by their inverting movement and are thereby enabled to discharge the ware toward or beyond the outer edge of the table, while moving in a circle of revolution larger than that which they occupy during their inner pressing positions.

Figure 11:
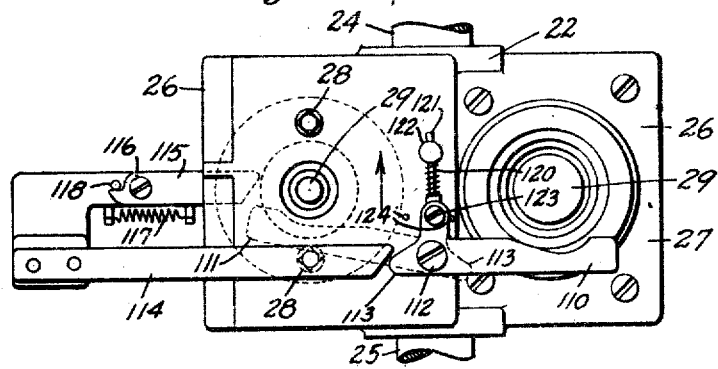
Figure 12:
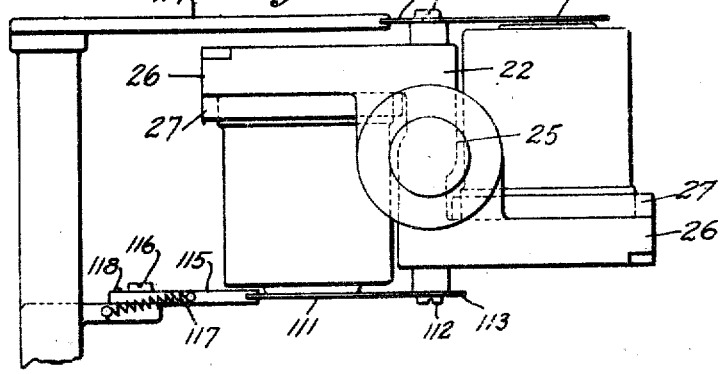
Figure 13:
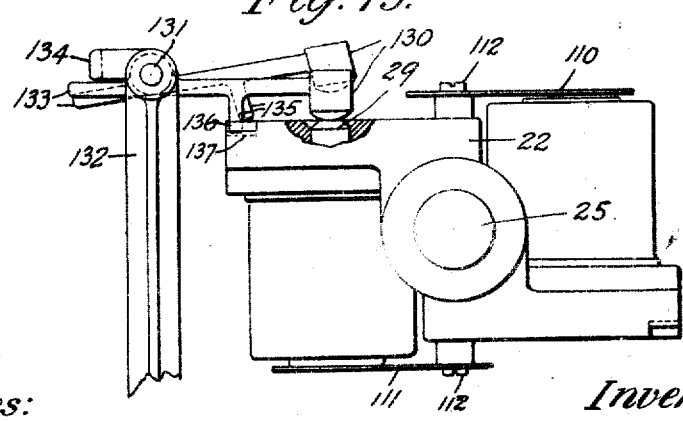

Figure 1 of the drawings is a side elevation mostly shown in section taken through the vertical center of the machine. Fig. 2 is a plan view, in which portions of the mechanism are broken away at different levels to show the parts more clearly. Fig. 3 is a side view in enlarged scale, in section taken on the line 3—3 of Fig. 4, showing portions of the pressing and mold reversing mechanisms. Fig. 4 is a front elevation also in enlarged scale, projected from Fig. 3, the right hand portion being shown in section taken through its vertical center. Fig. 5 is a fragmentary plan view in section taken on the line 5—5 of Fig. 4, showing the mold carrier and its inverting mechanism. Fig. 6 is a fragmentary plan view in section taken on the line 6—6 of Fig. 4. Fig. 7 is a fragmentary plan view in section taken on the line 7—7 of Fig. 4. Figs. 8, 9 and 10 are fragmentary side elevations, partly in section, showing the mold carrier and illustrating its turning and inverting movement. Fig. 11 is a plan view and Fig. 12 a side elevation, showing a pair of the molds and their mold carrier, and illustrating the construction and operation of their retaining fingers. Fig. 13 is a side elevation of one of the mold carriers showing the tapping mechanism. Fig. 14 is a front elevation, in section taken through the vertical plane of the guide rod centers, showing the mold ring mechanism.

The machine is mounted on a base 1 which supports a central column 2 upon which most of the machine is mounted and around which the moving parts, including the plungers and molds, revolve as a center. These revolving parts are supported upon a table 3 which is fitted to revolve freely around the column 2, ball bearings 4 being preferably employed to reduce the friction. The circumferential edge of the table is provided with gear teeth 5, which mesh with a pinion 6 fixed on the upper end of a vertical driving shaft 7 which is mounted to revolve in a bracket 8 secured upon the base 1. A worm gear 9, fixed upon the lower end of the shaft 7, is driven by a worm 10 on the horizontal driving shaft 11, which is supported in one or more brackets 12 and driven by means of a belt from any convenient source, engaging with the pulley 13. Or an electric motor may, if preferred, be mounted on or adjacent to an extension of the base 1 for driving the table through any suitable train of gearing.

In the machine herein illustrated the table 3 carries six sets of pressing mechanisms, which revolve with the rotation of the table around the central column 2, and operate while revolving to receive successive charges or gathers of glass while passing a delivery spout or other suitable means of feeding the glass from a melting furnace or other source of supply. The six plungers of the six pressing mechanisms are disposed in a circle around the table. Each of these plungers operates alternately upon two molds which are arranged in pairs, each pair being mounted upon a mold carrier which is turned a half revolution during the intervals between the pressing operations to bring its two molds in alternate succession into alinement with their mold ring and plunger. Each pair of molds coacts with a single plunger and a single mold ring, the latter of which is seated alternately upon the two molds of the pair, being raised during the intervals between the pressing operations to enable the molds to be turned, thus reversing them, inverting the filled mold and carrying it outside of the table, and at the same time bringing the empty mold right side up, into operative alinement with its plunger and mold ring, which are disposed in and move in a tangential relation to the path of turning movement of their respective molds.

In the arrangement shown herein each of the pressing plungers 50 is assumed to make one complete pressing operation for each of its revolutions around the central column 2. The working movements of the respective mechanisms are imparted by their engagement with stationary cams disposed in concentric relation to the column. The peripheral cam 93 for operating the mold rings is herein shown to be supported directly upon the base 1, while the cam paths or grooves for operating the plunger and mold mechanisms are appurtenant to a central cam 17 which is herein shown to be an integral casting supported and fixed upon the outside of the column 2, inside of the turret 16.

The base of the turret 16 rests upon and is firmly secured to the table 3 and rotates therewith. The upper central portion of the turret is journaled to the upper end of the column 2, thus centering these two parts with each other and mutually sustaining each other. The turret is generally circular in form inclosing within it the cam piece 17. The body or shell of the turret forms a support for some of the sliding mechanisms of the various mechanisms, and its upper end carries supporting brackets 38 for the upper ends of the guide rods 30 and for the plunger operating mechanism.

The molds 20, 21 are carried upon a series of trunnioned carriers 22, the trunnions 24, 25 of which are journaled in brackets 23 resting upon the top of the table 3, while the mold rings and plungers are mounted on yokes which are fitted to slide vertically on the guide rods 30, the lower ends of which are fixed in the table 3 while the upper ends are fixed in arms or brackets extending from or attached to the turret 16. These guide rods are preferably arranged in pairs spaced at equal angular intervals around the table (Fig. 2). Each plunger yoke 31 is fitted to slide on a pair of the guide rods (Figs. 4, 6), and is raised and lowered from above by a toggle jointed device consisting of the connecting rod 32 and a crank arm 33. The lower end of each connecting rod is pivotally attached to its plunger yoke 31 by means of wrist pins 35; and its upper end is connected to its crank 33 by means of the crank pin 34 and an eccentric bushing 36, the latter being circularly adjustable to vary the position of the plunger at the lower end of its stroke. (Figs. 3 and 4). The crank arm 33 is journaled by means of a shaft 37 supported on the brackets 38, extending from the upper end of the turret 16 (Figs. 1 and 2), which brackets also support the upper ends of the guide rods 30. These brackets are preferably made with removable caps 39, to facilitate the assembling and removal of the parts. The cranks 33 are, or are provided with, segment gears, having gear teeth 42 meshing with the teeth of racks 43, one for each plunger, which are fitted to slide vertically in guiding ways in the turret 16 supplemented by guiding brackets 44 extending upwardly from the top of the turret. The lower end of each rack is provided with a cam pin or roller 45 which projects through a slot 46 in the wall of the turret 16, all engaging in a cam groove extending around the peripheral face of the fixed cam 17. That cam groove is formed to impart the successive raising and lowering movements to the plunger as the latter revolve around the central column 2 and the fixed cam 17.

The parts are so arranged and proportioned that each toggle joint formed by its connecting rod 32 and crank 33 will be carried nearly to its straightened position shown at the left hand side of Fig. 1, at the completion of its pressing movement, where its greatest pressure is required. As a safety measure, to prevent the breaking of the parts when under excessive pressure due to the presence of abnormally hard or viscous glass in the mold, or from other causes, a yielding device is preferably provided for each plunger, best illustrated in Fig. 4. Each plunger 50 is provided with a stem 51, which extends centrally through the plunger base 52 and is held in place by a threaded nut 53. A suitable number of spring pressers 54 are seated in the plunger base and bear against the upper side of the plunger, the number and the tension of the pressers being adapted to suit the pressure required. The threaded nut 53 provides an adjustment for the initial yielding pressure of the pressers 54, and in conjunction with the eccentric bushing 36 enables the toggle joint to be set at its most advantageous position for the character of work being done. The plunger bases 52 are clamped to their respective yokes 31, by means of bolts 55.

The molds 20, 21, which may be of any desired form, are reversely disposed side by side in pairs upon opposite lateral wings 26 of a trunnioned mold carrier 22 having a cross-sectional outlet somewhat resembling a plain letter Z, as best shown in Fig. 1. Each pair of these molds may be made integral with its carrier and trunnions. But for convenience in renewing the molds, and in changing them to make different ware, they are preferably made separate from each other and from the carrier, and are clamped in proper position on their carriers in any convenient way, by bolting their bases or sides against their carrier, with their mold cavities opening in tangential relation to the path of their turning movement. In the embodiment herein shown the bases of the molds are centered by rings 27, and secured by screws 28, against the faces of the offset carrier wings 26, which face inwardly toward each other from opposite sides of the axis of turning movement of the carrier. The bottoms of the molds are provided with valves 29, the inner ends of which form the bottoms of the molds in the customary way, while the outer ends project through the supporting wings 26 of their respective mold carriers, to facilitate loosening and delivering the pressed ware from the molds.

One of these mold carriers thus provided with a pair of molds is associated with each of the plungers of the machine. The centers of the two molds of each pair are disposed at equal distances from, and on opposite sides of the axis of the mold carrier, with the mold cavities facing in one direction and the valve ends extending in the opposite direction, both in tangential relation to the curved path 59 of their turning movement with their carrier on its trunnions 24, 25. These trunnions extend from the opposite sides of the carrier and are journaled in the brackets 23, seated on the table 3 outside of the guide rods 30, so that the trunnions and their bracket supports extend past the outer sides of the guide rods with the molds swinging into the space between the guide rods into alinement with their plunger, when in their pressing position. This arrangement provides ample space for making the trunnion supports of ample dimensions. The axis of the trunnions is thus horizontally disposed in tangential relation to a circle of revolution outside that of the plungers and guide rods.

The trunnion carrier is turned in the brackets 23 during the intervals between the successive pressing operations, to bring the succeeding empty mold into pressing position and at the same time to carry the filled mold to its inverted position outside of the zone of the pressing operations. In the arrangement herein illustrated, having a pair of oppositely disposed molds, the carrier is turned a half revolution; and this turning movement may be forward and back, or may be continued intermittently in the same direction, according to circumstances, largely determined by the environing mechanism, and by the character of the mechanism found most convenient or available for turning the molds. In this embodiment the molds are turned intermittently in the same direction, indicated by an arrow 58 in Fig. 10, by the mechanism shown in Figs. 3, 4, 5, 8, 9 and 10. A ratchet wheel 61 is fixed upon the trunnion 24, as best shown in Fig. 4. An annular flange 62 of this ratchet is provided on its inner surface with two oppositely disposed notches 63 and 64 for receiving the end of a pawl 65 mounted by means of a pin 67 on a segment gear 66, which turns freely on and concentrically with the trunnion 24, and is turned back and forth slightly more than half a revolution by means of a double segment gear 68 mounted on a fixed stud 70, carried by a bracket 71 on the table 3. One segment of the gear 68 meshes with the teeth of the segment gear 66, the other segment engaging with the teeth of the rack 72 which is fitted for vertical sliding movement on the turret 16, as best shown in Figs. 3, 5 and 7. The rack is provided with a cam pin or roll 73 engaging with the cam groove 74 in a peripheral surface of the fixed central cam 17, that cam path being so disposed and shaped as to turn the mold carrier on its axis half a revolution in the direction of the arrow shown in Fig. 10, as each pair of molds reaches, in its revolution around the cam, the point where it is desirable to bring the next empty mold into its pressing position.

The edge of the table 30 is recessed at 77 beneath each carrier to enable the carriers and their molds to be revolved; and in order to provide a suitably firm support for the molds during the pressing operations, a movable abutment 78, in the form of a slide, best shown in Figs. 4, and 8 to 10 inclusive, is employed. As each mold carrying wing of the carrier is revolved on the carrier axis to its pressing position, it comes to rest upon the abutment, which at that time is pushed out beneath the inner wing of the carrier, as shown in Figs. 8 and 9, thus bridging the recess 77. Just before the time for again revolving any carrier to reverse its molds, the corresponding slide is drawn back, as shown in Fig. 10, leaving the recess 77 clear for the half revolution of the carrier and the molds. The sliding abutment is provided with a cam roll 79 engaging with a cam surface 80 on the cam 17, which draws back the slide 78 against the pressure of springs 82 to the position shown in Fig. 10 just before the molds are reversed. After the adjacent mold has swung clear of the sliding abutment 78, the latter is again let forward to the position shown in Figs. 8 and 9 to form a solid base beneath the wing of the carrier, for supporting that wing and its mold against the shaping pressure. For convenience in assembling and disassembling, the slide is herein shown as being made in two parts, 83 and 84, detachably fastened together by screws.

The mold rings 90 are supported in concentric relation to the plungers and to the pressing positions of the molds by means of yokes 91, which are fitted to slide upon the guide rods 30, as best shown in Figs. 1, 4, 7 and 14. A guide ring 92, having a flaring or funnel shaped flange to provide a more extended mouth for receiving the charges of molten glass, and guiding them centrally into the mold, is preferably secured to each of the yokes 91 concentrically with its mold ring by means of bolts. These mold ring yokes are moved up and down upon the guide rods 30 by means of the cam 93 (Figs. 1, 2 and 14), engaging with the cam pin or roll 94 on a yoke or cross head 95, secured at its ends to draft rods 96, extending upwardly within the guide rods 30, which are made in tubular form for this purpose. The lower portions of these draft rods preferably fit the inner walls of the tubular guide rods; but higher up they are turned to a smaller diameter to receive the sleeves 97, which also slide in the interior walls of the guide rods. These sleeves are yieldingly held downwardly against the shoulders 98 of the draft rods by means of springs 99 inclosed within the tubular guide rods 30. The upper ends of these springs abut against adjustable collars 100 on the upper ends of the draft rods 96, which are provided with nuts 105, by means of which the collars may be adjusted on the draft rods to vary the tension of the springs 99, which serve to hold the sleeves 97 yieldingly against the shoulders 98 of the draft rods, thus determining the initial pressure with which the mold rings are held down upon their respective molds during the pressing operation.

In order to allow the mold rings to conform accurately to their respective molds and form a tight joint between them to prevent the formation of flashes or fins of glass upon the surface of the jars at this joint, the mold ring yokes 91 are fitted with sufficient looseness for this purpose upon the guide rods 30; and a swiveling connection is made between the mold ring yokes and their sleeves 97. This connection is made by means of pintles 106, the bases 107 of which are secured to the yokes, and project through slots 108 in the walls of the guide rods 30. The inner ends of the pintles are seated in the walls of the sleeves 97, as best shown in Figs. 4 and 14, at approximately the level of the lower surfaces of the mold rings, so that the rocking movements of the mold rings with their yokes upon the pintles 106 will not materially affect the lateral registration of the mold rings upon their molds. These pintles are preferably disposed at opposite ends of the yoke, substantially in axial alinement with each other, and parallel with the axis of the mold carrier. This common axial center of the pintles is also preferably located so as to pass through the vertical center lines of the plungers and mold rings, which in turn are preferably located in a vertical plane passing through the centers of the guide rods, thus providing a "central draft" connection and guidance. This swiveling connection, with a moderate looseness in the fitting of the yoke upon the guide rods, and the independently yielding springs 99 constitute a universal joint which permits the mold rings to conform in any direction to such slight variations in or from the levels of their respective molds as may be due to inaccuracies of workmanship, uneven expansion of the parts by the heat, or to the presence of dirt or small chips of glass beneath the mold carriers and their supporting abutments 78.

As each mold of a pair is revolved by its carrier into its pressing position, their associated mold ring is moved down and seated on the top of that mold by means of the cam 93, which is shaped so as to carry the yoke a little below the level actually needed for bringing the mold ring into contact with the mold, the springs 99 yielding to the same extent, as shown in Fig. 14, thus putting the pressure of those springs upon the mold rings to hold them in position. In case the downward movement of the mold ring should be obstructed by accident, such as the breaking or disarrangement of the parts below it, or the presence of hard glass, the springs 99 enable the mold ring and yoke to yield to the obstruction, while permitting the cam cross-head 95 to make its complete stroke without undue strain upon any of the parts.

The mold rings 90 may be made integral with their respective yokes, but are preferably made separable from the yokes to enable the molds to be easily removed and replaced when worn out, or to enable different mold rings to be employed for different sizes and patterns of ware.

To prevent the pressed ware from dropping out prematurely during the inversion of the molds and while traveling in an inverted position, retaining fingers 110 and 111 are provided. These are pivotally mounted on the mold carriers by means of pivot screws 112 at locations which permit each finger to swing over and away from its mold opening as shown by a comparison of the positions of the upper finger 110 and the dotted lower finger 111, in Fig. 11. Just prior to the inversion of the mold, an extension 113 of the finger 110 collides with a stud or arm 114 attached to a fixed portion of the machine, and extending over the pathway of the mold as shown in Fig. 12. The revolution of the mold table on its vertical axis carries the arm 113 of the uppermost finger 110 in the direction of the adjacent arrow against the end of the stud 114, turning the finger from its position shown in Fig. 11, and swinging it partly over the mold opening far enough to prevent the ware from dropping out during and after the inversion of that mold. When the inverted mold arrives over the take-off device or other intended delivery position, the outer end of the finger which is beneath the inverted mold collides with another projecting stud 115 extending beneath the pathway of the mold, as shown in Fig. 12, whereupon the retaining finger is swung backwardly from beneath the ware, allowing the latter to drop out. In the particular arrangement here shown, in order to allow the retaining fingers to pass by the projecting stud 115, the latter is hinged at 116 and is yieldingly held in its operating position by means of a spring 117 against a stop pin 118. After the retaining finger 111 has swung to its fully open position, its continued movement swings the hinged stud 115 against the pressure of the spring until the finger passes by, whereupon the stud 115 is returned to its first position by its spring 117. The means provided for holding the retaining fingers 110, 111 yieldingly in their open and closed positions consists of a spring 120 coiled around a guide or plunger 121 fitted to slide in the stud 122 and joined at 123 to an arm of its retaining finger. The pressure of the spring 120 tends to hold the retaining finger in either of its two positions against the stop pins 124.

To more fully insure timely discharge of the pressed ware from the mold when inverted, a tapping device is preferably employed, which as herein shown consists of three or more hammers 130, which strike in succession upon the outer ends of the mold valve 29, projecting or exposed through the wing 26 of the mold carrier as shown in Figs. 1 and 13. These hammers are mounted side by side upon a pivot rod 131 supported at its ends by a stationary bracket 132 attached to the frame or base of the machine, and are provided with rearward extensions 133, which project beneath a cross-piece 134 of the bracket, which thus serves as a stop for the lower position of the hammers. For operating the hammers they are provided with arms 135, which engage with inclined ledges 136, formed on the outer ends of the mold carriers. As these carriers pass under the hammers with the revolving movement of the mold table, the arms 135 of the hammers ride upon the inclined ledges 136, thus raising the hammers, and then successively fall into depressions 137 as the center of the mold valve passes under the succession of hammers. The succession of blows operates to loosen the ware from the mold. The number of hammers should be adapted to the necessities of different sizes or shapes of glassware.

Among the advantages gained by the construction and arrangement above described may be mentioned the compact and yet open disposal of the parts, whereby the parts may be made of ample proportions, are easily watched while in operation, and are easily accessible for adjustment, removal, and repairs. The arrangement of the molds in pairs. The arrangement of the molds in pairs side by side instead of being end to end permits the use of multiple molds for each plunger without materially increasing the vertical dimensions of the machine; and with comparatively slight increase of its horizontal dimensions. Compactness in the disposal of the parts circularly around the table is also attained. The trunnioned and winged construction of the carrier allows each pair of guide rods 30 to be set fairly close together in their circle of revolution, and conveniently close to the opposite sides of their molds, thus better adapting them for guiding the plungers and mold rings in working relation to the molds. The central disposal of the molds, mold rings and plungers between their respective guide rods, and between the operating connections for the mold rings, insures a "central draft" connection and the consequent minimizing of side strains. This offset arrangement of the molds and trunnions, while enabling the molds thus to be placed between the guide rods, also enables the trunnions to extend at one side of and past the guide rods (Fig. 5), thus allowing ample space for trunnions of adequate diameter and length, and thereby also enabling the operating connections for the mold inverting mechanism to be made between the adjacent pairs of guide rods. Moreover, this offset arrangement of the molds at opposite sides of the axis of their turning movement, whereby the molds and their valves open in opposite directions, both tangential to the path of their turning movement, facilitates the operations both of pressing the ware and of discharging it from the mold. Each mold is firmly supported by the bed or table during its pressing operation, without imposing the pressure upon the trunnions, and at the same time its inverted companion mold is presented in a convenient position for discharging the ware at the other side of the trunnions, with the mouth opening of the mold facing downwardly and with the mold valve conveniently exposed for tapping, or other manipulation found necessary to release the pressed ware.

Furthermore, by thus arranging the molds to revolve upon axes which are tangential to their circle of revolution upon the table axis, so that the molds revolve in planes radial to the table axis, the molds are carried radially toward and from the latter axis, pressing the ware when in their inward position, and discharging the ware in their outer position, outside of the circle of the plunger and other mechanisms, in a free circular zone in which the tapper, take-off mechanism and cooling pipes or other appliances may be installed without interfering with the revolving and pressing mechanism. This arrangement of the revolving molds also enables their supporting abutments 78 to be disposed in and moved in, a radial relation to the axis of rotation of the mold table, requiring only a short radial movement of the abutments, all of which may thus be operated by a single central cam common to all the abutments. The disposal of the plunger, mold ring and cam yokes 31 and 95 in substantially the same plane with each other and with their pair of guide rods and tension springs, with the plunger crank pin 34 and the mold ring cam 93 working in substantially the same plane, enables the working pressures to be applied to the plungers and to the mold rings to best advantage, in direct lines, centrally with the resistances to be overcome.

The operation of the various parts having to a considerable extent already been described in connection with the foregoing description of their construction, a brief description of the consecutive operation of the machine will be sufficient.

The machine being started in operation, the plunger and mold mechanisms revolve with the table around the central column. Each plunger and mold mechanism performs its complete cycle of movement once for each revolution with the table. The charges of glass are fed into the succeeding molds at some convenient point in the rotation of the table, while the plungers are in their raised position, as illustrated at the right hand side of Fig. 1; but with the mold rings preferably down upon the mold. The plungers are then successively lowered until they reach the lowest position, illustrated at the left hand side of Fig. 1, at which the glass is completely pressed. Each plunger remains in the ware long enough to allow the latter to set and is then raised gradually to its highest position, in which it remains while the mold ring is also raised to its highest position; and the molds are reversed by imparting a half revolution to the mold carrier as already described and as illustrated in Figs. 8, 9 and 10, thus inverting the mold containing the ware last pressed, and bringing the succeeding empty mold into the pressing position. The mold ring is then lowered upon this second mold, a new charge of glass is fed into the mold, and another pressing operation is performed by repeating the cycle, just described, of the movements of the plunger. Meanwhile the piece of ware which was pressed in the first mold, and is now inverted, travels in that inverted position around a portion of the next rotation of the table, being held from falling out by the ware retaining fingers 110, 111, as already described, until it arrives at the take-off or discharge position, where the ware is released and falls upon or is delivered to a take-off or carrier upon or from which it is conveyed to a leer and annealed in the customary way. The delivery of the ware from the mold may be delayed until the mold approaches the position where it must again be revolved into pressing relation to the plunger. Thus each charge of glass, from the time it is first fed into the mold may be allowed to remain therein during nearly two revolutions of the pressing table. This, in the case of the six-plunger mechanism herein illustrated, means that each piece of ware may remain in its mold during the time that ten or more succeeding pieces are being pressed, thus giving ample time for the proper cooling and setting of the ware.

In the concrete embodiment of this invention shown and described herein, the plungers are forced downwardly into the molds to effect the shaping of the glass; but it will be obvious to those familiar with this art that many of the features of this invention are equally applicable to methods or processes in which the molds are forced upwardly against the plunger, to effect the shaping of the glass, these two forms being well understood to be reversals or alternations of each other.

I claim as my invention:—

1. In a glass shaping machine, the combination of a shaping plunger mounted for longitudinal and sidewise traveling movement relative to the machine, mold mechanism mounted to revolve and to travel sidewise with the plunger, and including a plurality of shaping cavities coöperating with the plunger and disposed in a path of revolution which is tangential to the longitudinal position of the plunger.

2. In a glass shaping machine, the combination of a reciprocating and sidewise traveling plunger, mold mechanism mounted for revolving movement and for sidewise traveling movement with the plunger relative to the machine, and provided with a plurality of shaping cavities disposed in tangential relation to a circle of revolution which is tangential to the line of reciprocation of the plunger.

3. In a glass shaping machine, the combination of a reciprocating and sidewise traveling shaping plunger, mold mechanism mounted for sidewise traveling movement with the plunger relative to the machine, and for revolving movement upon the axis located at one side of the line of reciprocation of the plunger, and provided with a plurality of shaping cavities located in tangential relation to a circle of revolution disposed in tangential relation to the plunger.

4. In a rotary glass shaping machine, the combination of a shaping plunger mounted for rotary movement with the machine and for longitudinal shaping movement substantially at right angles with its rotary movement, and mold mechanism also mounted to rotate with the machine in coöperation with the plunger, including a plurality of shaping cavities disposed in tangential relation to a circle, the plane of which is substantially radial to the rotary movement of the plunger and mold mechanism.

5. In a rotary glass shaping machine, a shaping plunger mounted for reciprocating shaping movement, and for rotary movement with the machine in a direction substantially at right angles to its shaping movement, mold mechanism mounted for rotation in coöperation with the plunger and also mounted for revolution around an axis disposed at one side of the line of reciprocation of the plunger, in a circle, the plane of which is substantially radial to the rotary movement of the plunger and mold mechanism, and is in the line of reciprocation of the plunger.

6. In a glass shaping machine, a mold carrier mounted for turning movement and provided with a plurality of molds reversely disposed side by side and overlapping each other upon opposite sides of the axis of said turning movement of the carrier.

7. In a glass shaping machine, a shaping plunger, a mold carrier mounted for turning movement relative to the plunger, and provided with a plurality of molds reversely disposed side by side and overlapping each other upon opposite sides of the axis of said turning movement of the carrier.

8. In a glass shaping machine, a mold carrier mounted for turning movement and provided with a plurality of mold supporting surfaces disposed upon the opposite sides and facing toward a plane passing through the axis of turning movement substantially parallel with the said surfaces.

9. In a glass shaping machine, a mold carrier provided with trunnions and having a plurality of mold supporting wings offset from each other upon opposite sides of the trunnion with their mold supporting surfaces facing toward a plane passing through the axis of the trunnions between and substantially parallel with the said wings.

10. In a glass shaping machine a shaping plunger, a mold carrier provided with trunnions mounted for turning movement and having a pair of oppositely disposed mold supporting wings offset sidewise from the trunnions in substantially tangential relation to the curve of their turning movement.

11. In a glass shaping machine, a rotary mold carrier provided with a substantially Z-shaped body.

12. In a glass shaping machine, a mold carrier provided with a substantially Z-shaped body, the opposite wings of which are adapted on their inner sides for supporting a pair of shaping molds, and trunnions extending on opposite sides of the Z-shaped body.

13. In a glass shaping machine, a mold carrier provided with a substantially Z-shaped body, and with a pair of supporting trunnions extending from opposite sides of the Z-shaped body, the end wings of the Z-shaped body being disposed in symmetrical relation to the trunnions.

14. In a glass shaping machine, a mold carrier provided with trunnions for turning movement, and having a substantially Z-shaped body, the end wings of which are provided on their inner surfaces with means for removably supporting interchangeable molds.

15. In a glass shaping machine, a mold carrier mounted for turning movement and provided with a pair of mold supporting surfaces substantially parallel with and facing toward each other, and symmetrically offset from each other on opposite sides of a plane substantially parallel with the said surfaces and passing between them through the axis of turning movement of the carrier.

16. In a glass pressing machine, a mold carrier provided with trunnions for supporting the mold carrier for turning movement and having mold supporting wings extending from between the said trunnions on opposite sides of the axis of the trunnions, with their mold supporting surfaces each facing toward a plane substantially parallel with the said wings, passing through the axis of the trunnions, between the wings.

17. In a glass shaping machine, the combination with a reciprocating shaping plunger, of a pair of coöperating shaping molds mounted for revolving movement and reversely disposed side by side in overlapping relation on opposite sides of their axis of revolution.

18. In a glass shaping machine, the combination of a plurality of shaping molds, and a mold carrier having a body of substantially Z-shaped cross-section, the molds being reversely disposed side by side upon the inward sides of the wings of the Z-shaped body.

19. In a glass shaping machine, the combination of a rotary table having guides, a shaping member mounted for sliding movement on the guides, and a plurality of coacting shaping members provided with supporting trunnions offset at the side of the guides.

20. In a glass shaping machine, the combination of a rotary table having guides, a glass shaping member mounted for sliding movement on the guides and a plurality of coacting shaping members provided with supporting trunnions disposed at the side of the guides, with the said coacting shaping member passing between the guides when turned on the trunnions.

21. In a glass shaping machine, the combination of a rotary table provided with guide rods, a glass shaping member disposed between and mounted for sliding movement on the guide rods, and a plurality of coacting shaping members provided with supporting trunnions having their axis disposed at one side of the guide rods with the said coacting members passing between the said guide rods in alinement with the first named shaping member when turned on the trunnions.

22. In a glass shaping machine, the combination of a rotating table provided with guide rods, a glass shaping member disposed between and mounted for sliding movement on the guide rods, and a plurality of coacting shaping members provided with supporting trunnions extending at one side of and past the guide rods, with the said coacting shaping members passing between the guide rods in a plane of movement substantially radial to the axis of rotation of the table in coacting alinement with the first named shaping member.

23. In a glass shaping machine, the combination of a revolving table provided with guide rods, a glass shaping member disposed between and supported for sliding movement on said guide rods, and a plurality of shaping members coacting with the first named shaping member and provided with trunnions disposed between its plurality of shaping members and at one side of the guide rods, whereby by the turning movement of the said plurality of shaping members on their trunnions any of them may be projected between the guide rods into alinement with the first named shaping member while revolving with the table.

24. In a glass shaping machine, the combination of a revolving table provided with guide rods, a shaping plunger mounted for sliding movement on the guide rods, and a mold provided with trunnions supported for turning movement on an axis disposed at one side of the guide rods and substantially tangential to its revolving movement with the table, with the mold projecting between the guide rods in coacting alinement with the plunger.

25. In a glass shaping machine, the combination of a revolving table provided with guide rods, a shaping plunger and mold ring mounted for sliding movement on the guide rods, and a shaping mold provided with trunnions supported for turning movement on an axis at one side of the guide rods and substantially tangential to its revolving movement with the table with the mold in coacting alinement with the mold ring and plunger.

26. In a glass shaping machine, the combination of a revolving table provided with guide rods, a plunger and a mold ring both disposed between and mounted for independent sliding movement on the guide rods, and a shaping mold provided with trunnions supported for turning movement on an axis disposed at one side of the guide rods and substantially tangential to its revolving movement with the table, with the mold projecting between the guide rods in coacting alinement with the plunger and mold ring.

27. In a glass shaping machine, the combination of a revolving table provided with guide rods, plunger and mold ring mechanisms mounted for independent sliding movement on the guide rods, and a plurality of molds provided with trunnions supported for turning movement on an axis disposed at one side of the guide rods and substantially tangential to its revolving movement with the table, the molds being disposed side by side on opposite sides of the axis of their trunnions, whereby any of said molds may be brought into coacting alinement with the plunger and mold ring, by turning them on their trunnions.

28. In a glass shaping machine, the combination of a revolving table provided with guide rods, plunger and mold ring mechanisms mounted for independent sliding movement on the guide rods, and a pair of molds provided with trunnions supported for turning movement on an axis disposed at one side of the guide rods and substantially tangential to its revolving movement with the table, the molds being reversely disposed side by side symmetrically on opposite sides of the axis of their trunnions, whereby either of said molds may be brought into coacting alinement with the plunger and mold ring by turning them on their trunnions.

29. In a glass shaping machine, the combination of a revolving table provided with a pair of guide rods, a plurality of yokes mounted to slide independently on the said guide rods, means for supporting glass shaping members on the said yokes, a mold carrier supported on the table and provided with trunnions disposed at the side of and extending past the said guide rods, and means for securing a plurality of shaping molds on the said carrier in coacting relation to the shaping members carried by the said yokes.

30. In a glass shaping machine, the combination of a revolving table provided with a pair of guide rods, a plurality of yokes mounted for sliding movement on said guide rods, glass shaping members secured to said yokes between the guide rods, and a mold carrier provided with trunnions supported on the table for turning movement on an axis at one side of the guide rods, and of the said shaping members, the carrier being provided with means for supporting a pair of shaping molds side by side on opposite sides of the said axis, whereby any of said molds may, by the turning movement of the carrier, be carried between the guide rods into and out of coacting alinement with the shaping members carried by the said yokes.

31. In a glass shaping machine, the combination of a revolving table provided with a pair of guide rods, a yoke sliding on said rods, and provided with a shaping plunger disposed between the said rods, a mold carrier provided with trunnions supported for turning movement on an axis disposed at the side of the guide rods and substantially tangential to its revolving movement with the table and having a pair of oppositely disposed mold supporting wings projecting sidewise from the said axis, whereby either of said wings may be swung between the said guide rods in a direction substantially radial to the table axis to carry its mold into coacting alinement with the said plunger.

32. In a glass shaping machine, the combination of a revolving table, a plurality of glass shaping members mounted on the table for partial revolution relative to the table, another glass shaping member disposed in coacting relation to the first named shaping members in a tangential relation to their path of partial revolution, and means for partially revolving the first named shaping members to bring them successively into coacting relation to the second named shaping member.

33. In a glass shaping machine, the combination of a revolving table, mold mechanism, mounted on the table for turning movement and having a plurality of glass shaping cavities opening in a substantially tangential relation to their path of turning movement, a mold ring mounted to move in tangential relation to said path, means for turning the mold mechanism to bring the shaping cavities successively into operative relation to the mold ring, and means for seating the mold ring over the successive shaping cavities when in said operative position.

34. In a glass shaping machine, the combination of a revolving table, a plurality of molds disposed side by side upon the table for turning movement relative to the table, and opening in a tangential relation to their path of turning movement, a mold ring mounted for movement in tangential relation to said path, and means operable while the table is revolving for turning the molds and moving the mold ring to seat the mold ring successively upon the molds.

35. In a glass shaping machine, the combination of a revolving table provided with an independently turning mold carrier, a pair of molds reversely disposed side by side on said carrier, with the mold cavities opening in tangential relation to their path of turning movement with the carrier, a mold ring disposed and movable in tangential relation to said path, means operable while the table is revolving for turning the carrier to bring said molds alternately into operating position in alinement with the movement of said mold ring, and means for seating the said mold ring on said molds.

36. In a glass shaping machine, the combination of a revolving table provided with guide rods, mold ring mechanism mounted for sliding movement on the said rods, and a plurality of molds mounted for turning movement on an axis located at one side of said guide rods, to carry the molds between the guide rods in register with the mold ring, means operable while the table is revolving for turning the said molds successively into the said registering position, and means for operating the mold ring mechanism in coacting relation to the successive molds.

37. In a glass shaping machine, the combination of a revolving table provided with guide rods, mold ring mechanism mounted for sliding movement on said rods, with the mold disposed between said rods, a plurality of molds reversely disposed side by side for turning movement on an axis located at one side of the said guide rods in substantially tangential relation to its revolving movement with the table and arranged to carry the molds by its turning movement successively between the said guide rods into operative relation to the mold ring, and means for operating the mold ring mechanism to seat the mold ring upon the successive molds.

38. In a glass shaping machine, the combination of a revolving table provided with guide rods, mold ring mechanism and plunger mechanism mounted for independent sliding movement on said rods, a plurality of shaping molds disposed side by side on opposite sides of an axis located at one side of the guide rods, and arranged to carry the molds successively into operative alinement with the mold ring and plunger, means for turning the molds to bring them successively into said operative alinement, and means synchronized with the table revolutions for operating the mold ring and plunger mechanisms in coaction with the successive molds.

39. In a glass shaping machine, the combination of a revolving table provided with plurality of shaping molds, a single mold ring and a single plunger, a pair of guide rods, yokes mounted for independent sliding movement on the guide rods, and provided with means for supporting the mold ring and plunger on the respective yokes in operative alinement with each other, a mold carrier supported for turning movement on trunnions disposed at one side of the guide rods, and provided with means for supporting the shaping molds in a reversely disposed relation side by side on the opposite sides of the axis of their turning movement, arranged to carry the molds successively into operative alinement with the mold ring and plunger, and means synchronized with the table revolutions for intermittently turning the molds and operating the mold ring and plunger in suitable time relation to each other.

40. In a glass shaping machine, the combination, with a revolving table provided with plurality of molds, a single mold ring and a single plunger, of a pair of guide rods, yokes mounted for independent sliding movement on said guide rods for supporting the mold ring and plunger in alinement with each other, and a mold carrier provided with trunnions supported for turning movement at one side of the guide rods, the carrier being provided with means for supporting the plurality of molds side by side in a reversely disposed position on opposite sides of the trunnion axis, whereby the molds are successively carried by the turning movement of the carrier into alinement with the mold ring and plunger, and means for operating said mechanisms in coaction with each other in timed relation to the revolutions of the table.

41. In a rotary glass shaping machine, the combination of a plurality of shaping molds mounted to revolve on the machine, and rotating with the machine, a movable abutment also rotating with the machine to support the molds successively in operative position, and means for retracting the abutment at determined positions in the rotary movement of the machine.

42. In a glass shaping machine, a rotating table, a mold mounted for turning movement relative to the table upon an axis at one side of and at right angles to the center line of the mold, a movable abutment for supporting the mold in its shaping position, and means operable in timed relation to the table rotations for moving the abutment into and out of its mold supporting position.

43. In a glass pressing machine, a rotating table, a shaping mold mounted on the table for turning movement, a movable abutment for supporting the mold in its shaping position against turning movement, and a cam for moving the abutment away from its mold supporting position in advance of the turning movement of the mold.

44. In a glass shaping machine, a rotating table, a shaping mold mounted on the table for turning movement, a movable abutment for supporting the mold in its shaping position against turning movement, and a cam for withdrawing the abutment from its mold supporting position in advance of the turning movement of the mold, the abutment being made in separable sections to facilitate removal and replacement.

45. In a glass shaping machine, the combination of a mold carrier mounted for turning movement, and provided with oppositely extending mold supporting wings, a movable abutment, and means independently of the wings for moving the abutment into and out of the pathway of the wings for intermittently supporting them.

46. In a glass pressing machine, the combination of a mold carrier mounted for turning movement and provided with a pair of oppositely extending reversely disposed mold supporting wings, shaping molds mounted on said wings, an abutment mounted for movement into and out of the pathway of the turning wings, and means independently of the wings for moving the said abutment into and out of the said pathway, for the purpose specified.

47. In a glass shaping machine, the combination of a glass shaping member, a guide rod on which the said member is mounted for sliding movement, and operating connections within the guide rod connecting with the said member to move it longitudinally upon the guide rod.

48. In a glass shaping machine, the combination of guide rods, means for supporting a glass shaping member for sliding movement on the guide rods, and operating means for the said member including connections sliding within the guide rods and coupled with the said supporting means through the walls of the guide rods.

49. In a glass shaping machine, the combination of a hollow guide rod, a glass shaping member mounted for sliding movement on the outside of the guide rod, another member within the guide rod and means connecting the two members through the wall of the guide rod to move them coincidently longitudinally of the guide rod.

50. In a glass shaping machine, the combination of guide rods, a yoke mounted for sliding movement on the guide rods, and operating means for the yoke extending inside of the guide rods and connecting with the said yoke through the walls of the respective guide rods.

51. In a glass shaping machine, the combination of a pair of guide rods, a yoke fitted for sliding movement on the outside of said rods, and operating connections for said yoke fitted to slide within the said rods, and connected with said yoke through the walls of the guide rods.

52. In a glass shaping machine, the combination of guide rods, a mold ring supporting yoke sliding freely on the guide rods, and operating means for the yoke having pivotal connections therewith, whereby the mold ring is free to swivel relative to said operating means.

53. In a glass shaping machine, the combination of guide rods, a glass shaping member mounted for free sliding movement on the guide rods, and operating means extending within the guide rods and pivotally connected with the glass shaping member through the walls of the guide rods to move together longitudinally of the guide rods.

54. In a glass shaping machine, the combination of guide rods, a glass shaping member having a yoke sliding freely on said guide rods, and operating means extending within the guide rods and having pivotal connections with opposite portions of the said yoke, the said pivotal connections being in the same axial line.

55. In a glass shaping machine, the combination of guide rods, a glass shaping member having a yoke mounted for free sliding movement on the guide rods, and operating means for the yoke extending within the guide rods, and having swiveling connections with the opposite ends of the yoke, the said swiveling connections being substantially in axial alinement with each other and with the centers of the guide rods.

56. In a glass shaping machine, the combination of guide rods, a yoke mounted for free sliding movement on the guide rods, and provided with means for supporting a glass shaping member with its center approximately in the plane of the centers of the guide rods, and operating means extending within the guide rods and having pivotal connections with the yoke, also in the said plane, thereby making a central draft connection with the yoke, while allowing the yoke to swivel upon the said pivotal connections.

57. In a glass shaping machine, the combination of a shaping mold supported for turning movement, and mold ring mechanism, including a mold ring pivotally mounted upon an axis substantially parallel with the axis of turning movement of the mold.

58. In a glass shaping machine, the combination of a mold mounted for turning movement upon an axis at one side of and at right angles with the mold center, a mold ring, and means for supporting the mold ring for rocking movement upon an axis substantially parallel with the axis of turning movement of the mold.

59. In a glass shaping machine, the combination of a mold mounted for turning movement at one side of and at right angles with the mold center, and mold ring mechanism including means for moving the mold ring to and from the mold, and a mold ring mounted for rocking movement upon an axis substantially parallel with the axis of turning movement of the mold.

60. In a glass shaping machine, the combination of a pair of molds reversely disposed side by side and mounted for turning movement upon an axis passing between the molds at right angles to their centers, and mold ring mechanism including a mold ring mounted on said mechanism for swiveling movement on an axis substantially parallel with the said axis of turning movement of the molds.

61. In a glass shaping machine, the combination of a mold mounted for turning movement, and disposed in tangential relation to its path of turning movement, a mold ring and mechanism for moving the mold ring toward and from the mold in the said tangential relation, the mold ring being supported for swiveling movement upon an axis substantially parallel with the axis of turning movement of the mold.

62. In a glass shaping machine, the combination of a plurality of molds mounted for turning movement and reversely disposed side by side in tangential relation to the path of their turning movement, a mold ring, and mechanism for moving the mold ring toward and from the molds in a mold ring toward and from the molds in a tangential relation to their path of turning movement, the mold ring being mounted for swiveling movement upon an axis substantially parallel with the turning movement of the mold, whereby the mold ring may swivel to compensate for variations in the turning position of the molds.

63. In a glass shaping machine, the combination of guide rods, a shaping member supporting yoke mounted for sliding movement on the guide rods, operating means connecting with the said yoke through the walls of the guide rod, and extending within the guide rod, a cam yoke secured to the said connecting means and a cam for operating these devices.

64. In a glass shaping machine, the combination of guide rods, a shaping member supporting yoke mounted for sliding movement on the guide rods, operating means connecting with the yoke through the walls of the guide rod and extending within the said rods beyond the ends thereof, a cam yoke secured to the said operating means, and a cam for moving the said yokes.

65. In a glass shaping machine, the combination of guide rods, a plurality of glass shaping members mounted for sliding movement on the guide rods, and operating connections disposed within the guide rods and connecting with one of said members through the walls of the respective guide rods.

66. In a glass shaping machine, the combination of hollow guide rods, a plurality of glass shaping members mounted for sliding movement on the said guide rods, and yielding operating connections for one of the said members disposed within the guide rods and connecting with the said member through the walls of the respective guide rods.

67. In a glass shaping machine, the combination of guide rods, a glass shaping member loosely fitting the guide rods, and operating connections within the guide rods flexibly connecting with the said member through the walls of the guide rods, whereby the said shaping member is free to rock relative to the guide rods and the operating connections.

68. In a glass shaping machine, the combination of guide rods, a glass shaping member loosely fitting the guide rods, and independently yielding operating connections within the guide rods connecting with the said member through the walls of the guide rods, whereby the said shaping member is free to rock relative to its operating connections.

69. In a glass shaping machine, the combination of guide rods, mold ring supporting means mounted for sliding movement on the said rods, and independently yielding draft devices disposed within the said rods and connecting with the mold ring supporting means.

70. In a glass shaping machine, the combination of guide rods, mold ring mechanism mounted for sliding movement on the rods, and independently yielding draft devices for the said mechanism, each including a rod, a sleeve mounted for sliding movement relative to said rod and engaging with said mold ring mechanism, and a spring acting on the said sleeve.

71. In a glass shaping machine, the combination of guide rods, mold ring mechanism mounted to slide on said rods, and independently yielding draft devices for the said mechanism, each draft device including a draft rod disposed within a guide rod, a sleeve operatively connected with the said mold ring mechanism, a spring acting on said sleeve, and means for adjusting the pressure of the spring.

72. In a glass shaping machine, the combination of hollow guide rods, mold ring mechanism mounted to slide on said rods, and independently yielding draft connections for the said mechanism, each connection including a draft rod disposed within the hollow guide rod, a sleeve mounted for limited sliding movement relative to said rod, a spring yieldingly opposing said sliding movement, and means for varying the opposition of the spring.

73. In a glass shaping machine, the combination of hollow guide rods, a mold ring yoke mounted to slide on said rods, and independently yielding draft connections for the yoke, including draft rods disposed within the respective guide rods, and sleeves sliding on said draft rods and abutting against shoulders thereof, operating connections between the yoke and each of the said sleeves, and draft tensioning devices comprising springs acting on the respective sleeves, and means for adjusting the tension of the springs.

74. In a glass shaping machine, the combination of hollow guide rods, a mold ring yoke mounted for sliding movement on the said rods, independently yielding operating connections for the yoke disposed within the respective hollow guide rods, each consisting of a shouldered rod, a sleeve sliding on the said rod and bearing against the shoulder thereof, connections between each of the said sleeves and the said yoke, tension adjusting devices for the springs, a cam yoke secured to the rods, and a cam for moving the cam yoke, all arranged and operating to slide the mold ring yoke on the guide rods and to hold the mold ring to its operating position with a predetermined initial tension.

75. In a glass shaping machine, the combination of a mold, guide rods, a mold ring yoke mounted for sliding movement on the guide rods, a cam for operating the said yoke, and independently yielding draft connections between the cam and the said yoke, including shouldered draft rods disposed within the guide rods, sleeves also sliding within the guide rods and bearing against the shoulders of the draft rods, spring devices for holding the sleeves yieldingly against the shoulders of the draft rods, and operating connections between the sleeve and the said yoke, whereby the draft connections operate as unitary members to move the mold ring yoke upon the rods, and yield independently at predetermined initial tensions when the mold ring is seated upon the mold.

76. In a glass shaping machine, the combination of a shaping mold, a mold ring, a yoke supporting the mold ring, guide rods upon which the said yoke is mounted for sliding movement, a cam for operating the yoke, and independently yielding elastic connections between the cam and the mold ring yoke, including sleeves sliding within the guide rods, and operatively engaging with the yoke, draft rods also sliding within the guide rods, and extending through the sleeves, stops on the guide rods for the sleeves, and adjustable elastic tension devices on the draft rod, yieldingly holding the sleeves against the said stops, whereby the mold ring is raised and lowered unyieldingly through its idle stroke, but yields at its said connections when the mold ring is seated upon the yoke with predetermined pressure.

77. In a glass shaping machine, the combination of a mold, and a carrier provided with means for interchangeably supporting different mold rings thereon, and provided also with means for interchangeably supporting different guides in substantially concentric relation to the respective mold rings for guiding the glass through the mold rings to the mold.

78. In a glass shaping machine, the combination of a rotary table, a shaping plunger revolving with the table, a plurality of molds mounted to revolve with the table and also mounted to revolve on an axis disposed at one side of the path of movement of the plunger, and means for revolving the molds on the said axis to bring them successively into coacting relation to the plunger.

79. In a glass shaping machine, the combination of a rotating table, a reciprocating plunger revolving with the table, a plurality of molds for the plunger mounted to revolve with the table and plunger, and also mounted for revolving movement in a substantially tangential relation to the path of movement of the plunger, and means for imparting the second said revolving movement of the mold in coaction with the reciprocations of the plunger.

80. In a glass shaping machine, the combination of a rotary table, a plurality of molds mounted for revolving movement with the table and also mounted for revolving movement in a path to which the molds are substantially tangential, and a shaping plunger also revolving with the table and movable in a tangential relation to the path of revolving movement of the said molds.

81. In a glass shaping machine, the combination of a table mounted to rotate on a vertical axis, a reciprocating shaping plunger mounted to revolve with the table, and a plurality of molds supported on the rotating table for movement on an axis located at one side of the path of reciprocation of the plunger in a tangential relation to the circle of table rotation, and means for turning the molds on the said axis to bring them successively into coacting alinement with the plunger.

82. In a glass pressing machine, the combination of a rotary table, a reciprocating shaping plunger mounted to revolve with the table, and a plurality of molds supported on the table for revolving movement on an axis located in tangential relation to a circle outside of the circle of the revolutions of the plunger, and means for revolving the molds on said axis successively into coacting relation to the plunger.

83. In a glass shaping machine, the combination of a rotary table, a plurality of shaping plungers revolving with the table, a pair of molds for each of the plungers, mounted to revolve with the table, and also mounted to turn on axes disposed in tangential relation to their respective paths of revolution with the table, and means operating upon each successive plunger and its pair of molds to turn the said molds and operate the plunger in coaction with each other.

84. In a glass shaping machine, the combination of a rotary table, a plurality of shaping plungers revolving in a circle with the table, a pair of molds for each plunger mounted to revolve with the table and supported for turning movement on an axis located outside of the circle of revolution of the plungers, the molds being offset sidewise from said axis to carry them successively into and out of coincidence with the circle of revolution of the plungers, means operating in succession on the plungers and their respective pairs of molds to turn the molds into the said path and to operate the plungers in coaction with said inwardly turned molds.

85. In a glass shaping machine, the combination of a table, guide rods mounted on said table, a shaping plunger supported for sliding movement on said guide rods, a pair of molds provided with trunnions supported for turning movement on an axis disposed outside of and substantially parallel with a plane passing through the centers of said guide rods, the molds being reversely disposed side by side on opposite sides of said axis, whereby they are by their turning movement carried between the said guide rods into operative alinement with their plunger, means for turning the molds on their axis and means for operating the plunger in conjunction with the turning movements of the molds.

86. In a glass shaping machine, the combination of a rotary table, provided with a plurality of pairs of guide rods disposed in a circle around the table, shaping plungers mounted for sliding movement on the respective pairs of guide rods, and a pair of molds for each plunger, each pair of molds being supported for turning movement on an axis located outside of the circle of guide rods, with the molds reversely disposed on opposite sides of the said axis, whereby at the inner position of their turning movement they are brought into operative alinement with their plunger, means for turning the molds to bring them successively into said alinement, and means for operating the plungers when in said alinement.

87. In a glass shaping machine, the combination of a rotary table, a plurality of guide rods disposed in a circle around the table, plunger and mold ring mechanisms mounted for sliding movement on the rods, a pair of molds for each plunger and mold ring, and a mold carrier for each pair of molds, provided with trunnions supported on the table for turning movement on horizontal axes located outside of the respective pairs of guide rods in a tangential relation to their path of revolution, the carriers being provided with means for supporting the said molds in a reversely disposed position side by side on opposite sides of the said axes, whereby the molds of each pair are alternately carried into operative alinement with their plunger by the turning movement of the carrier, means operating in succession upon the revolving plungers and their respective pairs of molds to turn said molds alternately into said operative alinement, and to operate the plunger while thus alined.

88. In a glass shaping machine, the combination of a rotary table, a plurality of sets of shaping mechanisms revolving with said table in a circular path, each set consisting of a shaping plunger, a mold ring, and a plurality of shaping molds, a pair of guide rods supported by said table for each of said sets, yokes movable on the said guide rods for moving the said plungers and mold rings, and a mold carrier for each of said sets provided with trunnions supported for turning movement on a horizontal axis located at one side of its pair of guide rods, and having means for supporting its plurality of molds to carry them in a circular path intersecting the circular path of revolution of their plunger, and mold ring means acting in succession upon the revolving sets of shaping mechanisms to turn the molds into operative alinement with their respective rings and plungers, and to operate the said rings and plungers when in said alinement.

In testimony whereof I have signed my name to this specification in the presence of two subscribing witnesses this 23rd day of December, 1913.

WILLIAM A. LORENZ.

Witnesses:
KARL E. PEILER,
NELLIE PHOENIX.

It is hereby certified that in Letters Patent No. 1,291,952, granted January 21, 1919, upon the application of William A. Lorenz, of Hartford, Connecticut, for an improvement in "Glass-Pressing Machines," errors appear in the printed specification requiring correction as follows: Page 8, lines 39, 54, 65, 76, 89, 104, 120, claims 23-29, page 9, lines 5, 22, 39, 51, 65, 76, 84, 90, 97, 103, 119, claims 30-38, page 10, lines 7, 29, claims 39-40, for the word "revolving" read *rotating;* page 9, line 53, claim 33, page 10, lines 69, 77, claims 43, 44, after the word "movement" insert the words *relative to the table;* page 9, line 57, claim 33, after the word "means" insert the words *operable while the table is revolving;* page 10, lines 2-3, 24, 46-47, claims 38-40, for the word "revolutions" read *rotations;* same page, claim 49, strike out line 120 and insert the syllables and words *bination of a stationary hollow guide rod forming a support for the machine, a glass shap-;* and that the said Letters Patent should be read with these corrections therein that the same may conform to the record of the case in the Patent Office.

Signed and sealed this 29th day of July, A. D., 1919.

[SEAL.]

J. T. NEWTON,
*Commissioner of Patents.*

Cl. 49—37.